United States Patent
Nichols et al.

(10) Patent No.: US 8,553,743 B1
(45) Date of Patent: Oct. 8, 2013

(54) SYSTEM, APPARATUS AND METHOD FOR COMMUNICATING MESSAGES USING MULTIPLE FREQUENCY HOPPING SEQUENCES

(75) Inventors: Steven Nichols, Maple Grove, MN (US); Kenneth Kidder, Coon Rapids, MN (US); Robert Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 1131 days.

(21) Appl. No.: 12/253,613

(22) Filed: Oct. 17, 2008

(51) Int. Cl.
*H04B 1/713* (2011.01)
(52) U.S. Cl.
USPC ............ 375/132; 375/130; 375/135; 375/136
(58) Field of Classification Search
USPC .......................................... 375/260, 130, 132
See application file for complete search history.

(56) References Cited

U.S. PATENT DOCUMENTS

| | | | |
|---|---|---|---|
| 5,463,659 A | 10/1995 | Nealon et al. | |
| 5,758,290 A | 5/1998 | Nealon et al. | |
| 5,927,599 A | 7/1999 | Kath | |
| 6,028,885 A | 2/2000 | Minarik et al. | |
| 6,213,404 B1 | 4/2001 | Dushane et al. | |
| 6,700,920 B1 | 3/2004 | Partyka | |
| 6,778,902 B2 | 8/2004 | Hathiram et al. | |
| 6,859,450 B1 | 2/2005 | Mansfield | |
| 6,870,875 B1 | 3/2005 | Partyka | |
| 6,925,105 B1 | 8/2005 | Partyka | |
| 7,050,906 B2 | 5/2006 | Hathiram et al. | |
| 7,224,713 B2 | 5/2007 | Partyka | |
| 7,301,986 B2 | 11/2007 | Partyka | |
| 2001/0004375 A1* | 6/2001 | Partyka | .......................... 375/135 |
| 2005/0047383 A1 | 3/2005 | Yoshida | |
| 2006/0227852 A1 | 10/2006 | Black et al. | |
| 2007/0291822 A1 | 12/2007 | Staley et al. | |

OTHER PUBLICATIONS

Proakis, John G.; Digital Communications; 1995; McGraw-Hill Inc.; 3rd Editions; pp. 695-753 and 849-862.*
U.S. Appl. No. 12/253,709, filed Oct. 17, 2008, Nichols.
U.S. Appl. No. 12/253,696, filed Oct. 17, 2008, Nichols.
U.S. Appl. No. 12/253,698, filed Oct. 17, 2008, Kidder et al.
U.S. Appl. No. 12/253,772, filed Oct. 17, 2008, Kidder et al.

* cited by examiner

*Primary Examiner* — Kabir A Timory
*Assistant Examiner* — Ross Varndell
(74) *Attorney, Agent, or Firm* — Seager Tufte & Wickhem LLC.

(57) ABSTRACT

Systems, apparatuses and methods for communicating messages via frequency hopping and utilizing multiple different frequency hopping sequences to facilitate the message or other data exchange. A transmitter frequency hopping sequence is provided that is derived from a set of available frequencies. A receiver frequency hopping sequence is also derived from those frequencies. The transmitter frequency hopping sequence differs from the receiver frequency hopping sequence, at least in regards to the order that the frequencies of the respective sequence will be involved in the message communication. The next frequency in the transmitter frequency hopping sequence is identified in which to transmit data. The data is transmitted at the identified communication frequency when that same frequency arises in the receiver frequency hopping sequence.

26 Claims, 10 Drawing Sheets

SYSTEM, APPARATUS AND METHOD FOR COMMUNICATING MESSAGES USING MULTIPLE FREQUENCY HOPPING SEQUENCES

FIELD OF THE INVENTION

This invention relates in general to communications, and more particularly to systems, apparatuses and methods for communicating messages via frequency hopping using separate transmit and receive frequency hopping sequences.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. Systems today are continually moving towards wireless communication, which generally makes installation more convenient, and among other things provides greater flexibility and scalability.

A drawback to wireless communication is that information transfer is not confined to a wire, as in a direct wired system. Rather, the information is transmitted over the air, and transmissions from neighboring systems can interfere with system communications. To address this issue, wireless network systems have employed various methods of transmitting radio signals, such as frequency hopping. Frequency hopping generally refers to a modulation technique where the signal carrier is rapidly switched among many frequency channels. Each party to the communication must know the frequency hopping sequence in order to know when it is to transmit at a certain frequency in the sequence. Using the frequency hopping sequence, transmitting devices can properly address targeted devices, and receiving devices can reject information from neighboring devices that are not within their system but within their reception range.

In systems employing multiple transmitting devices, it is possible for multiple messages to be sent to a receiving device(s) concurrently. For example, if all transmitting and receiving devices communicate information based on the same frequency hopping sequence, two or more transmitting devices can transmit messages on the same frequency channel at the same time. This can cause in collisions, resulting in a failure of some or all of the messages to be properly received at their destination.

If a collision situation occurs where the message(s) did not successfully reach their destination, subsequent attempts to send the same message may experience the similar collision problems. For example, where multiple transmitting devices having the same frequency hopping sequence transmit messages that collide, subsequently retransmitted messages may again be transmitted at the same frequency which can result in a further collision.

Accordingly, there is a need in the communications industry for a manner of wirelessly communicating messages in an orderly fashion, while accounting for collisions. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for communicating messages via frequency hopping while utilizing multiple different frequency hopping sequences to facilitate the message or other data exchange.

In accordance with one embodiment of the invention, a method is provided for facilitating communication between devices through the use of multiple frequency hopping sequences. The method involves providing a transmitter frequency hopping sequence of a plurality of communication frequencies in a first order, and providing a receiver frequency hopping sequence including at least the plurality of communication frequencies in a second order. The next communication frequency in the first order of the transmitter frequency hopping sequence is identified in which to transmit data. The data is transmitted at the identified communication frequency when the identified communication frequency of the transmitter frequency hopping sequence corresponds to a receiver-monitored frequency in the receiver frequency hopping sequence.

According to an alternative embodiment of the method, identifying the next communication frequency in the first order of the transmitter frequency hopping sequence involves storing the communication frequency at which the last data was transmitted, and identifying the communication frequency in the transmitter frequency hopping sequence that follows the stored communication frequency at which the last data was transmitted.

Another embodiment of such a method further involves monitoring the receiver frequency hopping sequence relative to time, where each frequency of the receiver frequency hopping sequence is successively monitored for a time interval in an order dictated by the receiver frequency hopping sequence, and the receiver-monitored frequency corresponds to a currently monitored frequency in the receiver frequency hopping sequence.

Another embodiment of such a method further involves determining when the identified communication frequency of the transmitter frequency hopping sequence corresponds to the receiver-monitored frequency in the receiver frequency hopping sequence. For example, determining when the identified frequency of the transmitter frequency hopping sequence corresponds to the receiver-monitored frequency may involve storing the receiver frequency hopping sequence which is used by at least one receiver, and tracking the expiration of time intervals in which each of the frequencies of the receiver frequency hopping sequence is the receiver-monitored frequency, until the identified communication frequency of the transmitter frequency hopping sequence becomes the receiver-monitored frequency.

According to another embodiment of the method, the receiver frequency hopping sequence corresponds to a frequency hopping sequence used by a receiving device(s) to which the transmitted data can be received.

In another embodiment, the method further involves monitoring by one or more receivers for transmitted data, one frequency at a time, on each successive frequency of the receiver frequency hopping sequence. In a particular embodiment, each monitored frequency of the receiver frequency hopping sequence is active for a predetermined time interval. Another embodiment further involves time synchronizing the receiver frequency hopping sequence in a transmitter transmitting the data with the receiver frequency hopping sequence at the receiver(s).

In accordance with another embodiment of the invention, a method is provided for facilitating communication between multiple transmitters and one or more receivers through the use of multiple transmitter frequency hopping sequences and at least one receiver frequency hopping sequence. The exemplary method includes providing multiple transmitter frequency hopping sequences from a common set of communication frequencies for each of a respective plurality of transmitting devices. Each of the transmitter frequency hopping sequences includes the common set of communication frequencies in an order different from the transmitter frequency hopping sequences of the other transmitting devices. A receiver frequency hopping sequence is also derived from the common set of communication frequencies. The communication frequencies of the receiver frequency hopping sequence are in an order different from the orders of any of the transmitter frequency hopping sequences. At each transmitting device, the next communication frequency of its respective transmitter frequency hopping sequence in which to transmit a message is identified. Each transmitting device determines when its identified next communication frequency corresponds to a receiver-monitored frequency in the receiver frequency hopping sequence. Messages are transmitted from the transmitting devices at their respective next communication frequencies, when each of the identified communication frequencies of their respective transmitter frequency hopping sequences corresponds to the receiver-monitored frequency in the receiver frequency hopping sequence.

In another embodiment of such a method, providing multiple transmitter frequency hopping sequence involves providing a different transmitter frequency hopping sequences for each of a corresponding number of transmitting devices.

In another embodiment, identifying the next communication frequency of a transmitting device's respective transmitter frequency hopping sequence involves storing the communication frequency at which the respective transmitting device's last message was transmitted, and identifying the communication frequency in its transmitter frequency hopping sequence that follows the stored communication frequency at which the last message was transmitted.

According to another embodiment, the method further involves each of the transmitting devices monitoring the receiver frequency hopping sequence relative to time. Each frequency of the receiver frequency hopping sequence is successively monitored for a time interval in an order dictated by the receiver frequency hopping sequence, whereby the receiver-monitored frequency corresponds to a currently monitored frequency in the receiver frequency hopping sequence.

In yet another embodiment, the receiver frequency hopping sequence corresponds to a frequency hopping sequence used by a receiving device(s) to which the transmitted data can be received. In another embodiment the method further involves receiving the messages at the receiving device(s) when the receiver frequency hopping sequence reaches the receiver-monitored frequency that corresponds to the respective communication frequencies used by the transmitting devices to transmit the messages.

In another embodiment, the method further involves identifying a collision of messages transmitted by at least two of the transmitting devices. At a device(s) that is notified of or otherwise becomes aware of the collision, the next communication frequency of its respective transmitter frequency hopping sequence in which to retransmit the respective message is identified. The device(s) that is aware of the collision determines when its respective next communication frequency corresponds to the receiver-monitored frequency in the receiver frequency hopping sequence. The respective messages from the device(s) that is aware of the collision retransmits the same message when each of the identified communication frequencies of their respective transmitter frequency hopping sequences corresponds to the receiver-monitored frequency in the receiver frequency hopping sequence.

In another embodiment the method further includes sharing the receiver frequency hopping sequence among one or more receiving devices. In yet another embodiment, the method further involves time-synchronizing the receiver frequency hopping sequence in the transmitting and receiving devices.

In accordance with another embodiment of the invention, an apparatus is provided that includes a transmission frequency determination module configured to identify a transmission frequency in a first frequency hopping sequence. A transmission timing module is configured to determine at what time the identified transmission frequency occurs during successive intervals of a second frequency hopping sequence. A transmitter is configured to transmit a message at the identified transmission frequency of the first frequency hopping sequence when the identified transmission frequency occurs at one of the successive intervals of the second frequency hopping sequence.

A system is provided in accordance with another embodiment of the invention, where the system includes at least one receiving device and a plurality of transmitting devices. The receiving device(s) includes a receive timing module configured to successively monitor for messages at each frequency of a receiver frequency hopping sequence. Each of the transmitting devices includes a frequency determination module configured to identify a transmission frequency in a transmitter frequency hopping sequence. A transmission timing module in the transmitting device is configured to determine when the identified transmission frequency occurs during successive intervals of the receiver frequency hopping sequence. The transmitting device's transmitter is configured to transmit a message at the identified transmission frequency of the transmitter frequency hopping sequence when the identified transmission frequency occurs at one of the successive intervals of the receiver frequency hopping sequence.

According to another embodiment of such a system, each of the transmitting devices is associated with a different transmitter frequency hopping sequence, and each of the different transmitter frequency hopping sequences differ from the receiver frequency hopping sequence.

According to another embodiment of the system, the transmission frequency determination module is configured to identify the transmission frequency by identifying the next consecutive frequency in the transmitter frequency hopping sequence relative to the frequency most recently used by the transmitting device to transmit a preceding message.

According to another embodiment of the system, each of the transmitting devices includes a storage to store the transmitter frequency hopping sequence. The transmitter frequency hopping sequence for each of the transmitting devices is unique relative to other transmitter frequency hopping sequences in the system.

According to an alternative embodiment, each of the plurality of transmitting devices includes a storage to store a seed that is unique relative to seeds of other transmitting devices in the system. The transmitting devices that store seeds in this manner further include a processor configured to generate a system-unique transmitter frequency hopping sequence based on their respective seeds.

According to another embodiment, the at least one receiving device further includes a processor configured to identify a frequency of the receiver frequency hopping sequence in which to transmit data to one or more of the plurality of transmitting devices, and further includes a transmitter configured to transmit the data at the identified frequency. In yet another embodiment, the data transmitted by the receiving device(s) to the one or more transmitting devices includes time synchronization data usable by the transmitting devices to time synchronize at least the receiver frequency hopping sequence.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention relates to communicating information between multiple devices. One aspect of the invention involves wirelessly communicating information between devices using radio frequency (RF) transmissions, where the transmission of messages or other information can be sent at any of a plurality of available transmission frequencies. Frequency hopping is used to the extent that transmissions of information and receptions of communicated information take place according to sequences of communication frequencies. In one embodiment, the receiving device(s) operates using a frequency hopping sequence that is different than the frequency hopping sequence used by the transmitting device(s). The transmitting device transmits information at the next available frequency of its frequency hopping sequence, but does not transmit that information until that same frequency arises in the receiver's frequency hopping sequence. In such an embodiment the transmitter sequence determines which frequency to use in transmitting the information, and the receiver sequence determines when that transmission will occur.

Figure 1:
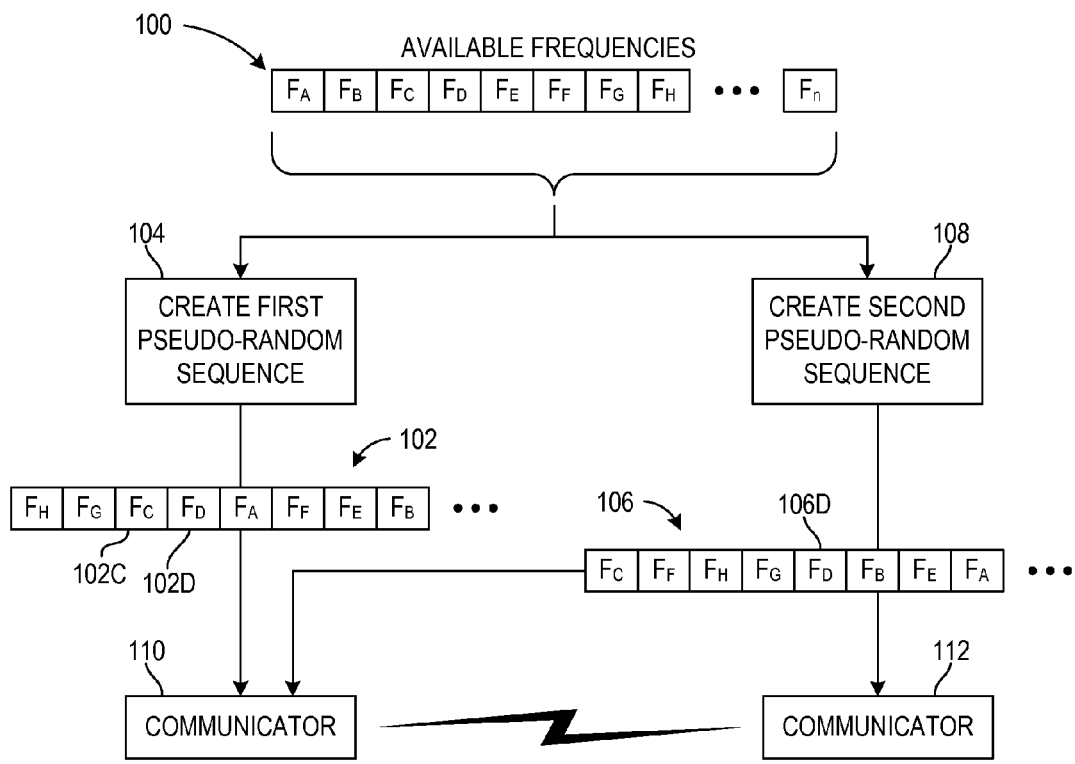
FIG. 1 is a block diagram of one embodiment of a manner for communicating information in accordance with the present invention.

FIG. 1 is a block diagram of one embodiment of a manner for communicating information in accordance with the present invention. The embodiment of FIG. 1 utilizes RF communications and frequency-hopping to avoid interference with other RF devices that may be within the wireless communication range. In a frequency hopping system, the communication frequencies do not remain constant, but rather are changed over time and/or in connection with triggering events in order to continually change the frequency in which information is communicated.

For example, in the embodiment of FIG. 1 a plurality of frequencies 100 are available for use in any of the frequency hopping sequences that will be utilized. In one embodiment there are fifty available frequencies 100, although the number of available frequencies 100 may be any number. Multiple frequency hopping sequences are used in accordance with the invention. Each of the different sequences may be determined in advance. Alternatively, each of the different sequences may be randomly selected or randomly created. "Random" selection or creation of the sequences may involve purely random techniques, such as creating a purely random sequence with no external input or influence. In another embodiment, "pseudo-random" sequences are selected/created, such as by creating a particular sequence based on a random or locally-unique input, such as a "seed." Thus, when referring to a "random" herein, this includes varying degrees of randomness, and does not require absolute randomness. For example, the generation of a "random" sequence may be based on a seed(s) that will produce the same sequence based on the same seed. Further, different algorithms for producing random seeds and random sequences vary in the degree to which the result is "random," and the present invention includes any degree of randomness. Any manner of selecting or creating different sequences may be used in connection with the present invention.

In the embodiment of FIG. 1, two pseudo-random sequences are used. Pseudo-random sequences as used herein suggest that the sequence is based on an input, such as a random seed. However, the invention is equally applicable to sequences generated in a purely random fashion (e.g. without using a seed or other input). Thus, while reference is made in the exemplary embodiments herein to "pseudo-random" sequences, the description of the embodiments is equally applicable to any sequence, whether purely random, partially random, or fixed.

In the example of FIG. 1, a seemingly random sequence can be generated using a random or unique seed as the input for generating the sequence. A first pseudo-random sequence 102 is created 104 from the available frequencies 100, and a second pseudo-random sequence 106 is created 108 from the same set of available frequencies 100. As a result, the first pseudo-random sequence 102 has a sequence of frequencies in an order different than the order of frequencies of the second pseudo-random sequence 106. It should be noted that the first pseudo-random sequence could, in theory, include only a subset of the available frequencies 100 that are used in the second pseudo-random sequence.

In the embodiment of FIG. 1, it is assumed that a first communicator 110 will transmit information to a receiving communicator 112. The receiving communicator 112 will monitor or "listen" for information at one of its frequencies in the second pseudo-random sequence 106 for a time interval before then listening to the next frequency in the second pseudo-random sequence 106. The communicator 110 is privy to the second pseudo-random sequence 106 in addition to knowing its own first pseudo-random transmission sequence 102. The communicator 110 uses the first pseudo-random sequence 102 to determine the frequency at which any pending information will be transmitted. For example, if the communicator 110 previously transmitted information at a carrier frequency $F_C$ 102C, it will next transmit information at $F_D$ 102D since it is the next frequency in its sequence 102.

As can be seen from the embodiment of FIG. 1, the first pseudo-random sequence 102 is used to determine the frequency at which the communicator 110 will transmit information. The communicator 110 will transmit that information when the corresponding frequency becomes active in the second pseudo-random sequence 106, which is used in receiving information by the communicator(s) 112. As the communicator 112 sequentially listens to each of the frequencies in the second pseudo-random sequence 106, the communicator 110 also tracks the second pseudo-random sequence 106 to know when the communicator(s) 112 will be receiving information at the communicator's 110 expected transmit frequency. The communicator 110 may be made aware of the second pseudo-random sequence 106 in any desired manner, such as generating the same second pseudo-random sequence 106 itself, receiving the second pseudo-random 106 from the communicator 112 or elsewhere, etc. Additionally, the communicator 110 time synchronizes its version of the second pseudo-random sequence 106 to the receiving communicator's 112 version of the second pseudo-random sequence 106. In this manner, the communicator 110 knows when the communicator 112 is monitoring for incoming messages at its scheduled transmit frequency. For example, if both the transmitter and receiver know how long each frequency of the second pseudo-random sequence will be monitored, and they know the first frequency of the sequence to monitor and when it will start monitoring it, they can both track the monitored frequency contemporaneously. Adjustments can be made for clock/oscillator deviations in the transmitting and receiving devices to keep the second pseudo-random sequence substantially time synchronized in the transmitting and receiving devices. One exemplary manner for time synchronizing devices is to use transceivers in each device so that information pertaining to the time synchronization can be communicated between the devices. It should be recognized that the time synchronization process does not need to be exact, nor does any particular method for effecting the time synchronization need to be used, for purposes of the invention.

When the next frequency in the first pseudo-random sequence 102 arises at which the communicator 110 is to transmit information, it will therefore wait to transmit that information until the same frequency arises in the second pseudo-random sequence 106. For example, if the communicator 110 is to transmit a pending message at $F_D$ 102D, it will do so when the frequency $F_D$ 106D arises in the second pseudo-random sequence 106. A more specific example is depicted in FIG. 2.

Figure 2:
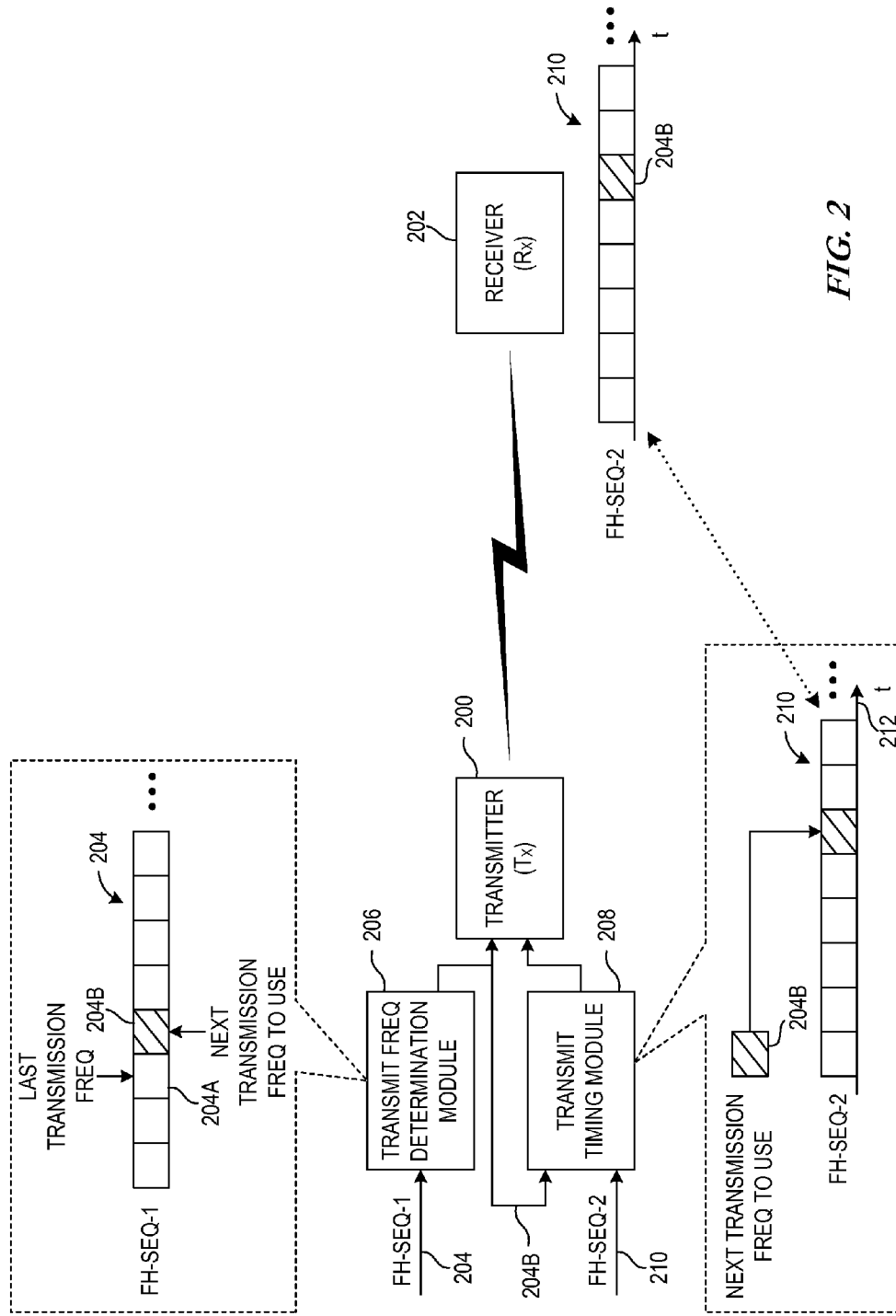
FIG. 2 is a block diagram illustrating a representative manner in which a transmitting device transmits data using frequency hopping and multiple frequency hopping sequences.

In the embodiment of FIG. 2, a transmitter ($T_x$) 200 is configured to wirelessly communicate information, such as one or more messages, to the receiver ($R_x$) 202. The $T_x$ 200 has its own frequency hopping sequence in which it is to transmit its messages, shown as FH-SEQ-1 204. A transmit frequency determination module 206 determines which frequency of the FH-SEQ-1 204 the $T_x$ 200 is to use for transmitting the next message. For example, the transmit frequency determination module 206 may locally or remotely store the FH-SEQ-1 204, and may also store the last transmission frequency 204A that was used to send a message. By knowing the sequence FH-SEQ-1 204, and by knowing the last transmission frequency 204A used, the transmit frequency determination module 206 can readily identify the next transmission frequency 204B in the FH-SEQ-1 204. In another embodiment, only a seed value is stored, and the FH-SEQ-1 204 is calculated each time it is needed, such as via an index number.

As a more particular example, the transmit frequency determination module 206 can compare the last transmission frequency 204A to the FH-SEQ-1 204. Upon finding a matching frequency in the sequence 204, the next transmission frequency 204B in the sequence can be identified. In another embodiment, the transmit frequency determination module 206 may maintain a pointer value to memory locations sequentially storing the frequencies of FH-SEQ-1 204, and may advance the pointer to the next memory location each time a message is sent.

Rather than comparing a stored "last frequency" value to the sequence 204, the next transmission frequency 204B to use in transmitting a message may be calculated. An example is now described. In this example, calculation of the frequency hopping sequence utilizes a seed. For example, assume there are fifty frequencies to be used in a hopping sequence. In one example of a frequency hopping sequence calculation, the fifty frequency identifiers (e.g., $F_0$, $F_1$, $F_2$, etc.) are arranged into two rows in sequential order (i.e. top row $F_0$-$F_{24}$ and bottom row $F_{25}$-$F_{49}$. This creates 25 frequency "pairs" with each pair spanning 25 frequency IDs (e.g., pairs $F_0/F_{25}$, $F_1/F_{26}$, etc.). The exemplary algorithm then involves dividing the set into three groups of frequency IDs: 0-24; 25-37; 38-49. Group 25-37 is shuffled based on the seed. Shuffling in this sense means moving the relative positions of the frequency IDs, but any shuffling methodology can be used. Group 38-49 is then shuffled in a like, or different manner. Because of the two rows of frequency IDs, shuffling these two groups results in a new list of pairs consisting of a member of group 0-12 with a member of group 25-37, and a list of pairs consisting of a member of group 13-24 with a member of group 38-49. Then, the pairs can be shuffled based on the seed, the order of random pairs reversed based on the seed, and the sequence becomes each column from left to right. Such an algorithm may be used to calculate the transmitter frequency hopping sequence (FH-SEQ-1 204) and/or receiver frequency hopping sequence (FH-SEQ-2 210). It should be recognized that any frequency calculation algorithm may be used, and the above is provided merely to facilitate an understanding of what sequence generation based on a seed may involve.

To then identify the next transmission frequency to use from the calculated frequency sequence, an algorithm to apply to that sequence can be used to identify the appropriate transmission frequency. An embodiment of such a frequency calculation algorithm may be represented in the form:

$$FreqID = f(\text{Position, Seed}) \text{ where:} \quad \text{EQUATION 1}$$

FreqID = the ID of the frequency that occurs at Position.

Frequency IDs are assigned in increasing order where:

0 = the lowest frequency

49 = the highest frequency $f(\ )$ = the frequency calculation algorithm

Position = the position of the frequency in the sequence where

0 = the first position

49 = the last position

Seed = a 16 bit number that determines the hop sequence

The above representative algorithm returns the identified frequency at the desired position. For example, the "position" may represent an incremented position relative to the last frequency used to transmit data. When the seed is used to generate the frequency hopping sequence, the "position" then identifies the proper frequency of the frequency hopping sequence to use for transmitting the current data. As can be seen, the algorithm can be adjusted to any number of available frequencies.

The above merely describes representative manners in which the next transmission freq 204B can be determined using a transmit frequency determination module 206. However, any desired manner for determining the next transmission frequency 204B may be used in connection with the invention.

Returning to FIG. 2, a transmit timing module 208 is provided. The transmit timing module 208 includes two (or more) inputs, including the output of the transmit frequency determination module 206 (i.e., the next transmission frequency to use 204B), and the second frequency hopping sequence shown as FH-SEQ-2 210. Each of the frequencies in FH-SEQ-2 210 become sequentially active over time (t) 212. The transmit timing module 208 determines when the next transmission frequency 204B becomes active in the receiver's FH-SEQ-2 210. When this occurs, the $T_x$ 200 transmits the message, at the frequency 204B, to the $R_x$ 202 that is listening for messages at the frequency 204B at that time.

It should be recognized that the transmit frequency determination module 206 and the transmit timing module 208 may be implemented in any one or more of hardware, firmware, software, discrete circuits, etc. For example, in one embodiment, a processor is programmed to perform the tracking, storing, comparing and/or other functions used by the modules 206 and 208. Alternatively, hardware compare functions, timing functions and other functions may be implemented for any or all of the functions performed by these modules 206, 208. Accordingly, hardware, firmware, software or any combination thereof may be used to perform the various functions and operations described herein.

Figure 3:
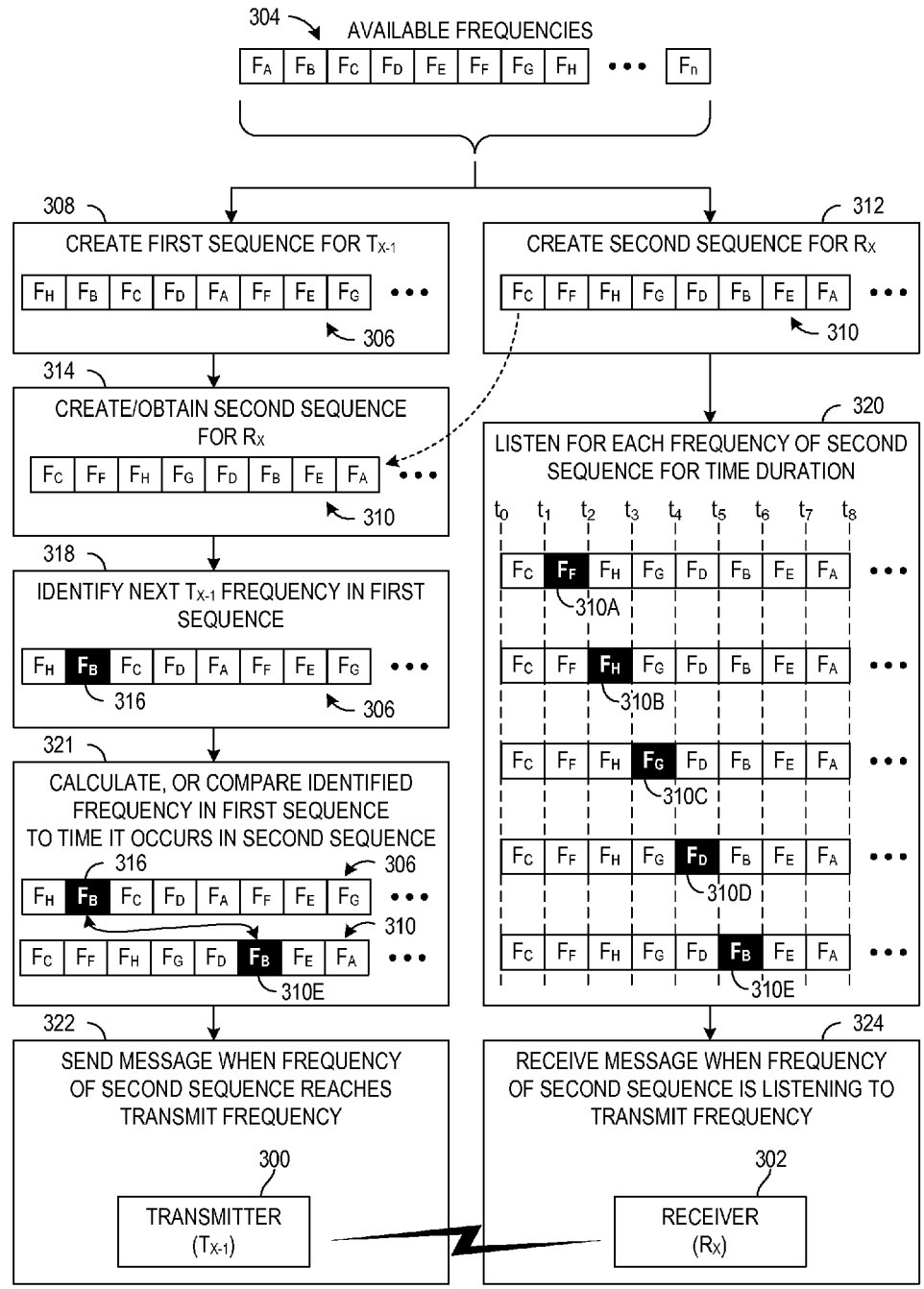
FIG. 3 depicts a more particular example in which a transmitting device communicates information to a receiving device using frequency hopping and multiple frequency hopping sequences.

FIG. 3 depicts a more specific embodiment in which a transmitting device 300 can communicate information to a receiving device 302 in accordance with the present invention. A plurality of available frequencies 304 is provided from which a plurality of frequency hopping sequences can be created. In one embodiment, the number of available frequencies 300 is fifty, although any number can be used in accordance with the invention.

In accordance with one embodiment, each transmitting device in the communicating system generates or otherwise obtains its own unique frequency hopping sequence, and any receiving devices share a common frequency hopping sequence. In the illustrated embodiment of FIG. 3, there is one transmitter 300 and one receiver 302, and therefore only two distinct frequency hopping sequences are used. The first frequency hopping sequence 306 is created 308 for the first (and only, in this embodiment) transmitter $T_{X-1}$ 300 from the set of available frequencies 304.

A second frequency hopping sequence 310 is created 312 for the receiving device(s) 302. The second frequency hopping sequence 310 is also created or otherwise obtained 314 for use with the transmitting device 300. For example, a seed or other value(s) may be known or provided at both the transmitting and receiving ends, such that the same second frequency hopping sequence 310 can be generated therefrom. More specifically, an algorithm may be used to create a particular sequence when the same known, random or pseudo-random input/seed is used, thereby enabling both the sending and receiving ends of the communication to generate the second frequency hopping sequence. Such a shared frequency hopping sequence can be provided in a manner described herein, or as described in co-pending U.S. patent application Ser. No. 12/253,772, filed on Oct. 17, 2008, and entitled "System, Method And Apparatus For Selecting Frequency Hopping Sequences," the content of which is incorporated herein by reference in its entirety. However, any manner of sharing a common frequency hopping sequence can be used, including sharing the frequency sequence itself.

For use in transmitting information, the next transmitter frequency 316 to be used in the first frequency hopping sequence is identified. It is this carrier frequency 316 that will ultimately be used by the transmitter 300 to transmit the message to the receiver 302. Meanwhile, the second frequency hopping sequence 310 is time synchronized such that the active or "listened to" 320 frequency changes to the next frequency in the sequence 310 upon expiration of a time period. For example, from time $t_1$ to time $t_2$, the receiver 302 is configured to monitor for messages or other information transmitted at the frequency $F_F$ 310A. When the time interval expires at time $t_2$, the receiver 302 is configured to start listening for messages at the next frequency $F_H$ 310B in the second frequency hopping sequence 310. In this manner, the receiver 302 is configured to sequentially receive messages at each of the frequencies in its sequence 310.

The transmitting device also knows the second frequency hopping sequence 310. Again, the transmitting device can generate or otherwise obtain 314 this information in any desired fashion. The transmitting device calculates (e.g. Equation 1 above) or performs a comparison 321 to determine the time when the transmission frequency 316 becomes the active listening frequency in the second frequency hopping sequence 310. In the illustrated embodiment, the frequency $F_B$ 310E becomes active in the second sequence 310 between time $t_5$ and time $t_6$. Thus, when the second sequence 310 reaches the frequency $F_B$ 310E corresponding to the same frequency $F_B$ 316 in the first sequence 306, the transmitter 300 sends 322 the message, which is received 324 by the receiver 302 that is monitoring for messages on carrier frequency $F_B$ 310E starting at time $t_5$.

One particularly useful implementation of the invention is where multiple transmitters are employed in the system of communicating devices. In one typical RF frequency hopping arrangement, each of the transmitters and receivers in a system may all use the same frequency hopping sequence. While the use of frequency hopping in this fashion may mitigate interference or interception by other RF devices, the problem of collision avoidance arises when multiple devices attempt to transmit information to a receiver(s) using the common frequency hopping sequence. Use of the techniques described above in a multi-transmitter system provide inherent collision avoidance, as described more fully below.

Figure 4A:
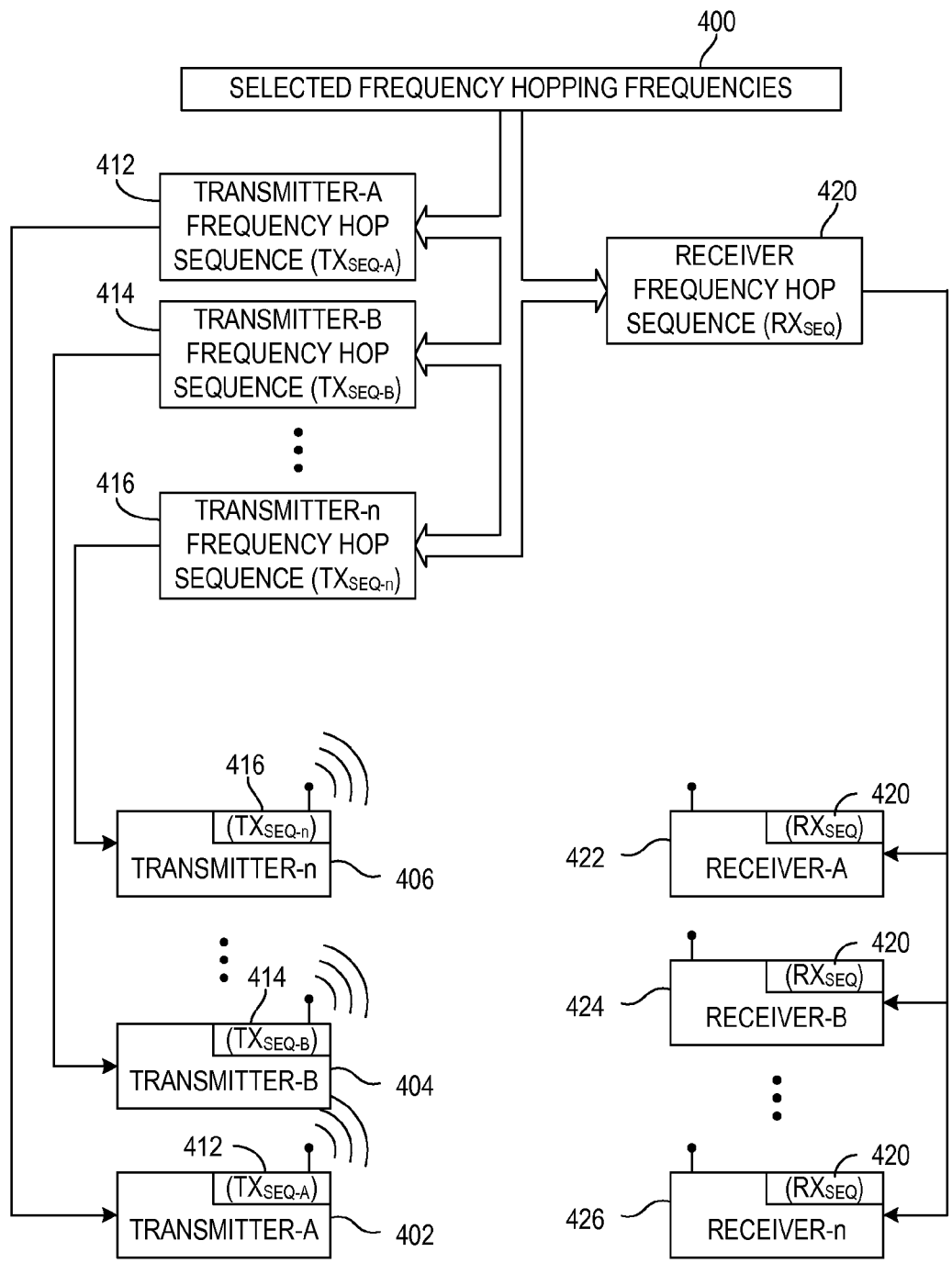
FIG. 4A illustrates a embodiment involving multiple transmitting devices each employing separate transmitter frequency hopping sequences and a shared receiver sequence to transmit messages.

FIG. 4A illustrates a multi-transmitter embodiment implementing principals of the present invention. A set of selected frequency hop frequencies 400 is used as the available frequencies from which multiple, distinct frequency hop sequences can be generated. A plurality of transmitting devices are associated with the system, such as transmitter-A 402, transmitter-B 404, etc. For each of the transmitting devices, a different frequency hop sequence is provided. For example, a first order of occurrence of the frequency hop frequencies 400 may be used as the transmitter-A frequency hop sequence ($TX_{SEQ-A}$) 412 which is then used by transmitter-A 402. Similarly, a transmitter-B frequency hop sequence ($TX_{SEQ-B}$) 414, which is different from $TX_{SEQ-A}$ 412, is used by transmitter-B 404. This assignment of different frequency hop sequences occurs for each of the transmitters through the $n^{th}$ transmitter-n 406, which uses transmitter-n frequency hop sequence ($TX_{SEQ-B}$) 416 which is different than all of the other transmitter frequency hop sequences.

Each transmitting device can derive its own frequency hopping sequence, or can receive it from an external source. In one embodiment each transmitting device 402, 404, 406 calculates its own transmitter frequency hopping sequence. To increase the chances of the transmitter frequency hopping sequence being different from the other transmitter frequency hopping sequence, each transmitting device can use a device-specific identifier as part or all of the seed used to generate the frequency hopping sequence. For example, a device-specific address or assigned device identifier (ID) can be used in a frequency hopping sequence algorithm, where the different seed inputs will result in different resulting frequency hopping sequences.

According to one embodiment of the invention, all receivers in the system hop frequencies using a common receiver sequence that all receivers share. This receiver frequency hop sequence $RX_{SEQ}$ 420 is thus used in each of the one or more receivers A 422, B 424, . . . n 426. The receiver frequency hop sequence $RX_{SEQ}$ 420 is time synchronized, such that in one embodiment all receivers 422, 424, 426 listen to the same frequencies at the same time, and change frequencies after the same time interval. In one embodiment, the common receiver frequency hop sequence $RX_{SEQ}$ 420 is different from all of the transmitter frequency hop sequences ($TX_{SEQ-A}$) 412, ($TX_{SEQ-B}$) 414, ($TX_{SEQ-n}$) 416.

Figure 4B:
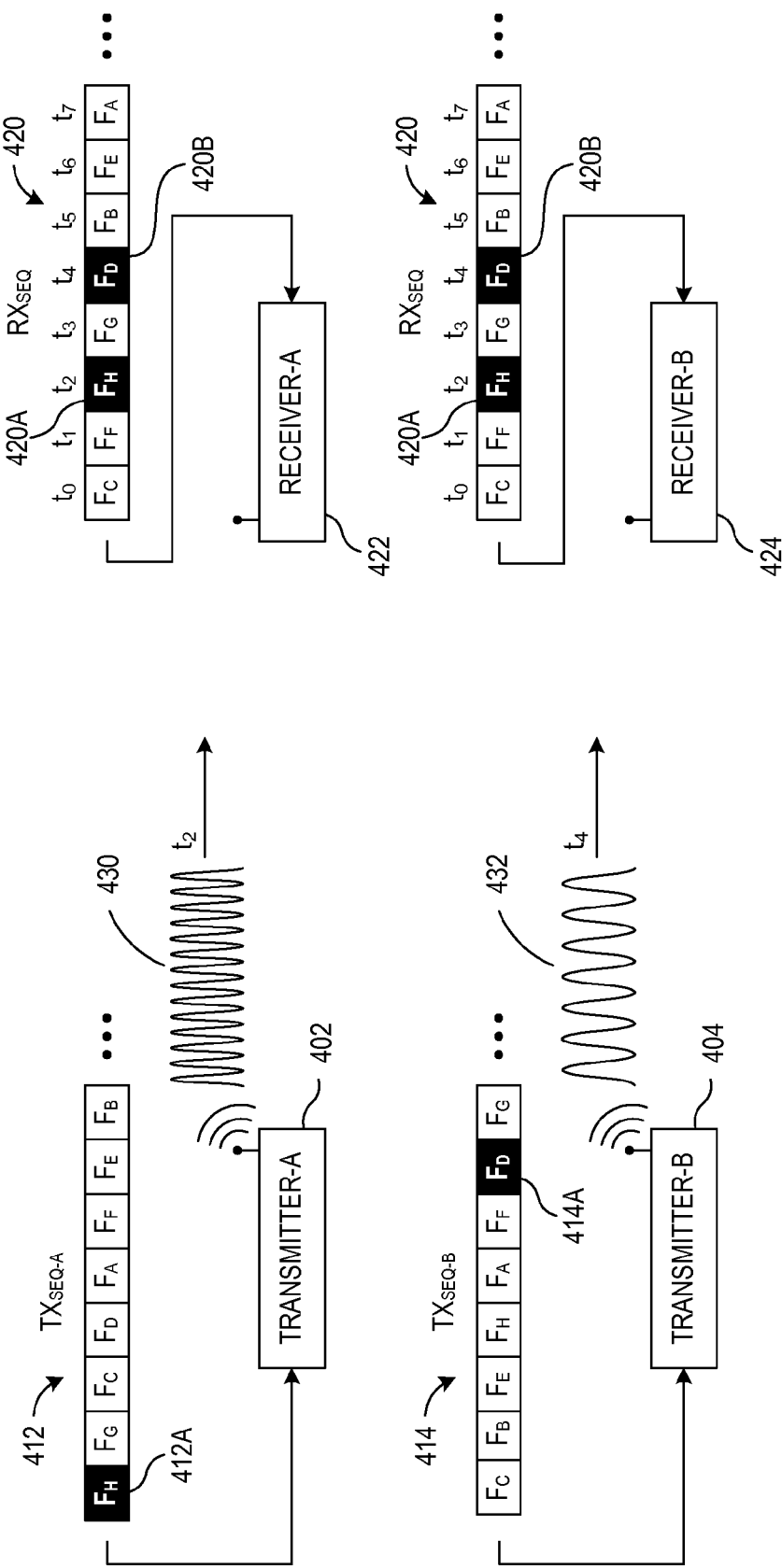
FIG. 4B illustrates an example of how a plurality of transmitting devices can avoid collisions when transmitting messages to one or more receiving devices in accordance with the principles of the present invention.

In operation, each of the transmitters 402, 404, 406 is aware of the common receiver sequence 420 as previously described. Each transmitter determines what its next transmission frequency will be, and also monitors when it will transmit its message(s) based on the receiver sequence 420, as was described above in connection with FIGS. 1-3. FIG. 4B illustrates an example of how a plurality of transmitting devices can avoid collisions when transmitting messages to one or more receiving devices. FIG. 4B uses reference numbers corresponding to those of FIG. 4A where applicable.

In FIG. 4B, it is assumed there are at least two transmitters, labeled transmitter-A 402 and transmitter-B 404. It is also assumed there is at least one receiver, and in the illustrated embodiment there are two receivers labeled receiver-A 422 and receiver-B 424. Each of the transmitters 402, 404 have a frequency hop sequence that is different from one another, and different from the receiver sequence. Particularly, transmitter-A 402 has a frequency hop sequence $TX_{SEQ-A}$ 412, transmitter-B 404 has a frequency hop sequence $TX_{SEQ-B}$ 414 which is different from $TX_{SEQ-A}$ 412, and both receivers A 422 and B 424 use a common receiver frequency hop sequence $RX_{SEQ}$ 420 that is different from either of the transmitter frequency hop sequences $TX_{SEQ-A}$ 412, $TX_{SEQ-D}$ 414.

By monitoring its respective transmitter frequency hop sequence, each of the transmitters 402, 404 can determine the next frequency at which it will transmit a message(s). For example, the next frequency at which transmitter-A 402 will transmit a message is frequency $F_H$ 412A, and the next frequency at which transmitter-B 404 will transmit a message is frequency $F_D$ 414A.

By monitoring $RX_{SEQ}$ 420, each of the transmitters 402, 404 can determine when it should transmit its message to one or both of the receivers 422, 424. For example, when frequency $F_H$ 420A becomes active in $RX_{SEQ}$ 420 at time $t_2$, transmitter-A 402 sends its message on a carrier signal 430 at the frequency $F_H$ 412A. At that time, the receivers 422, 424 are monitoring for messages at that frequency, $F_H$ 420A. The message may be sent to both receivers 422, 424, or may be targeted for only one of the receivers by providing a target address or other identifier with the transmitted message.

Analogously, when frequency $F_D$ 420B becomes active in $RX_{SEQ}$ 420 at time $t_4$, transmitter-B 404 sends its message on a carrier signal 432 at the frequency $F_D$ 414A. At that time, the receivers 422, 424 are monitoring for messages at that frequency, $F_D$ 420B. The message may be sent to both receivers 422, 424, or may be sent to one of the receivers by providing a target address or other identifier with the transmitted message.

As seen from FIG. 4B, the use of different transmitter frequency hop sequences $TX_{SEQ-A}$ 412, $TX_{SEQ-D}$ 414 relative to the distinct receiver frequency hop sequence $RX_{SEQ}$ 420, each transmitter will likely transmit its message at a time different from another transmitter's message transmission. This provides a significant degree of collision avoidance in message transmission.

Because the number of frequencies in each sequence is a finite number, there is, however, a chance that two or more transmitters will attempt to transmit their respective messages at the same time. For example, the "next" frequency to use in both of the transmitters A 402 and B 404 could, at some point, both be set to the same frequency. The likelihood that two messages from two transmitters will be sent at the same time is one divided by the number of frequencies in the sequence. For example, where there are fifty frequencies in each of the transmit and receive sequences, the probability that two transmitters will try to transmit at the same time is 1/50. The present invention accounts for this possibility as described below.

A collision is used herein to refer to the situation where two or more transmitters attempt to transmit their respective messages at the same time, notwithstanding the relatively low probability of this happening as described above.

However, if a collision occurs, a retry of each of the colliding messages will take place. In other words, each of the transmitters will resend its message that was subject to the collision. In accordance with an embodiment of the invention, each transmitter will resend its message at the next frequency in its respective transmitter frequency hop sequence. Because each of the transmitters has its own sequence (e.g. $TX_{SEQ-A}$ 412, $TX_{SEQ-B}$ 414, etc.), the "next" frequency that will be used for the retry in each of the transmitter frequency hop sequences is again unlikely to be the same frequency; i.e. as long as the transmitters use different carrier frequencies for the retry procedure, the retried messages will be sent at different times, depending on where their respective retry frequencies appear in the receiver sequence $RX_{SEQ}$ 420. As can be seen, there is a progressively decreasing probability that continued message retries will collide with the message transmission from one or more other transmitters. Thus, not only does the present invention provide for inherent collision avoidance for original transmissions, it provides an effective random backoff by using different frequencies for retries by having each transmitter select the next frequency in its respective sequence for successive message retries.

Figure 5A:
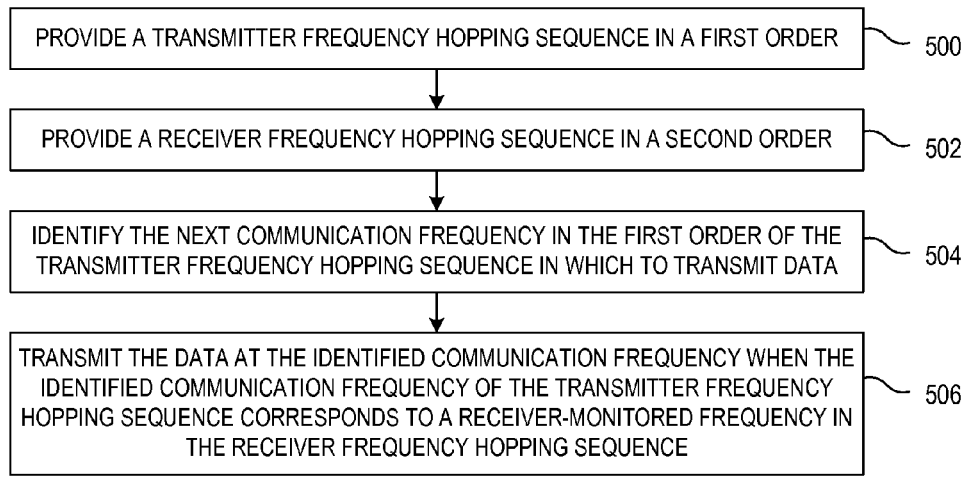
FIGS. 5A and 5B are flow diagrams of representative methods in which a transmitter can communicate messages using multiple frequency hopping sequences.

FIG. 5A is a flow diagram of a representative embodiment of a method for communicating messages or other data in different frequency channels in accordance with the invention. A transmitter frequency hopping sequence having a first order of frequencies is provided 500. The order of the frequencies represents the order or sequence of frequencies in which data will ultimately be transmitted. Also provided 502 is a receiver frequency hopping sequence that includes the relevant frequencies in a second order. The next frequency of the transmitter frequency hopping sequence in which data is to be transmitted is identified 504. For example, assume an example where the transmitter will transmit each of a plurality of messages at a different frequency. In this case the next frequency in the sequence, relative to the last frequency used to transmit the immediately preceding message, is identified for the message pending transmission. When the frequency has been identified, and when the identified frequency corresponds to an actively-monitored frequency in the receiver frequency hopping sequence, the data is transmitted 506 at the identified frequency of the transmitter frequency hopping sequence.

Figure 5B:
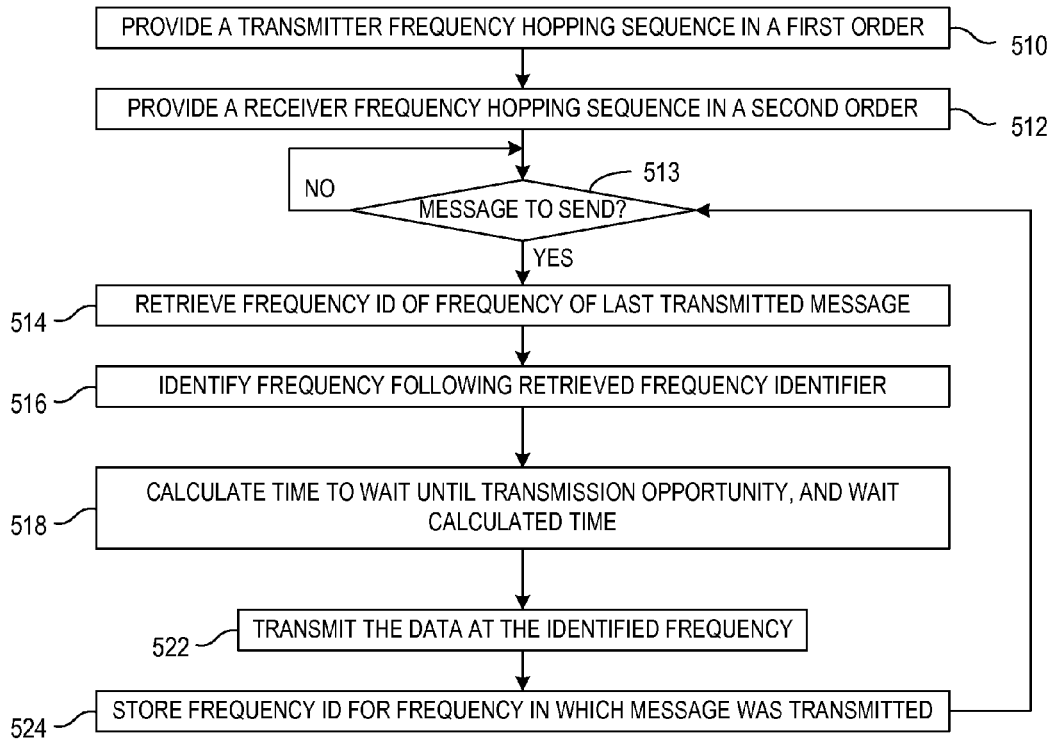

FIG. 5B is a flow diagram illustrating another representative embodiment of a method for communicating messages or other data in different frequency channels in accordance with the invention Transmitter and receiver frequency hopping sequences are provided 510, 512. When 513 a message is to be sent, the next frequency in the transmitter frequency hopping sequence in which data will be transmitted is identified. In the illustrated embodiment, this identification occurs as a result of the last frequency in which a message was transmitted has previously been stored. This frequency of the last transmitted message is retrieved 514, from which the immediately following frequency in the sequence can be identified 516. This represents one example, as numerous other manners for identifying the frequency in which to transmit are equally applicable. For example, the frequency hopping sequence can be stored, and an address pointer can be incremented upon each message transmission to point to the next frequency in the list.

It is determined when the frequency that was just identified arises in the receiver frequency hopping sequence. Which frequency of the receiver frequency hopping sequence that is being monitored by receiving devices is dependent on time, as previously described. In one embodiment, the time until the next transmission opportunity arises based on the receiver frequency hopping sequence is calculated 518. If the identified frequency has not yet become active in the receiver frequency hopping sequence, the transmitter waits until this occurs. When it occurs, the data is transmitted 522 at the identified frequency; i.e. at the next frequency of the transmitter frequency hopping sequence relative to the frequency at which the last message was sent. In order to facilitate subsequent determinations of the frequency in which to transmit data, a frequency identifier (ID) is stored 524 that corresponds to the frequency of the transmission that just occurred.

When the next message is to be sent 513, that stored frequency ID is then retrieved 514 to identify 516 the next frequency in which to transmit 522 data.

Figure 6:
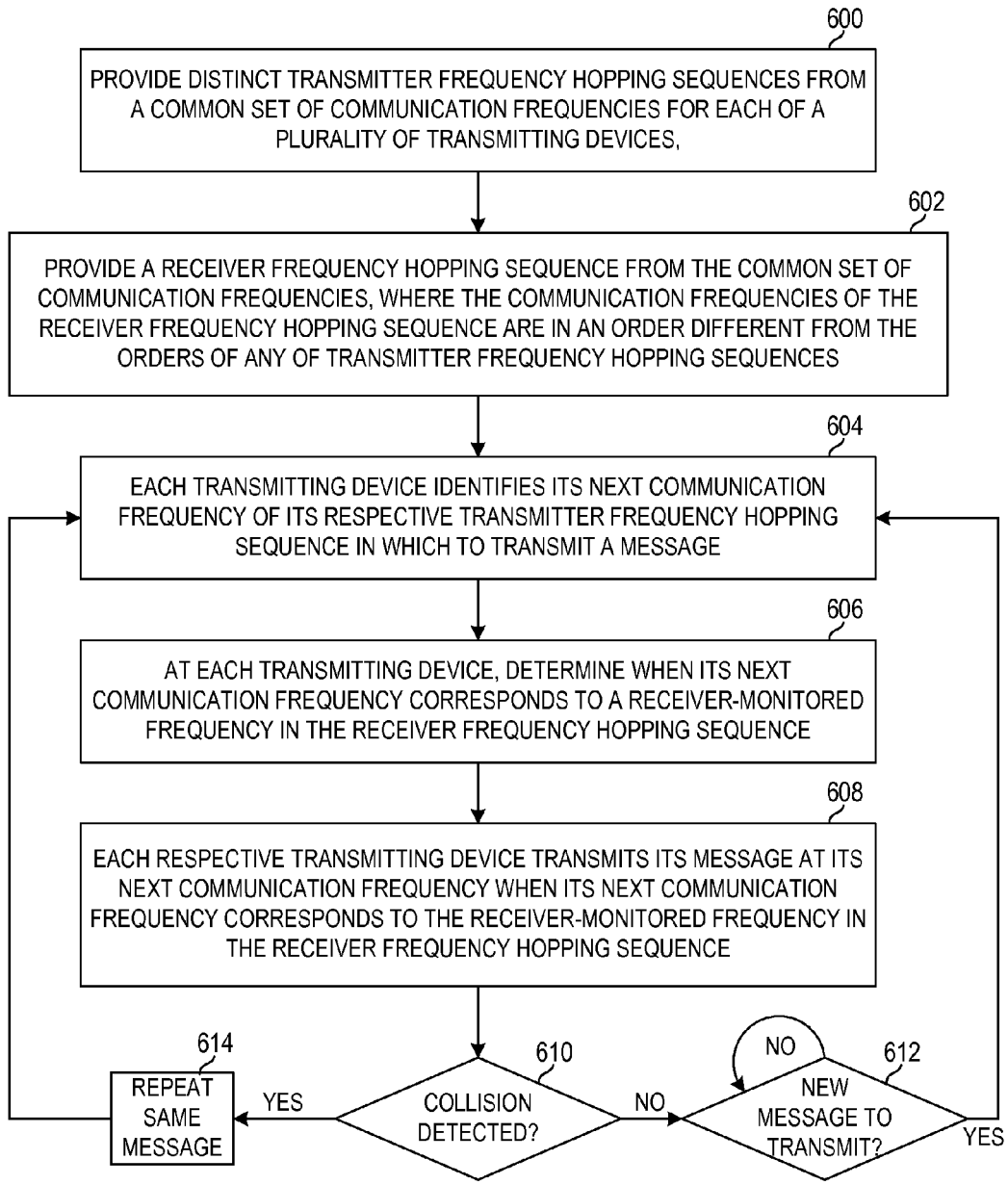
FIG. 6 is a flow diagram of a representative method in which multiple transmitters communicate messages via separate transmission frequency hopping sequences.

FIG. 6 is a flow diagram of a representative embodiment of a method in which multiple transmitters communicate messages via separate transmission frequency hopping sequences. In this embodiment, each of the transmitters in the system is provided 600 with a different frequency hopping sequence. Each transmitter can be provided with its distinct frequency hopping sequence in any manner, including transmitters creating their own sequences, receiving distinct sequences from an external source(s), etc. In one embodiment, each of the transmitter frequency hopping sequences is created from a common set of frequencies. For example, if there are frequencies $F_0$-$F_{49}$, each of the sequences will be derived from those fifty frequencies.

A receiver frequency hopping sequence is also provided 602 from the common set of frequencies (e.g. $F_0$-$F_{49}$). While each transmitter may use all available frequencies in their respective sequences, any transmitter may use a subset of the set. For example, if the receiver frequency hopping sequence uses fifty frequencies $F_0$-$F_{49}$, a transmitter could use a lesser quantity, such as $F_0$-$F_{20}$. In other embodiments, the transmitters each use all of the available frequencies of the common set in their respective frequency hopping sequences.

Each transmitting device identifies 604 its next communication frequency in its frequency hopping sequence in which to transmit a message. Each transmitting device determines 606 when its next communication frequency corresponds to a receiver-monitored frequency in the receiver frequency hopping sequence. For example, where receivers are using the receiver frequency hopping sequence, they will monitor for messages at one of the frequencies of the receiver sequence, and after some time duration (or other triggering event) they will monitor for messages at the next frequency of the receiver sequence. Each transmitting device mimics this by also tracking what the active frequency currently is in the receiver frequency hopping sequence. When the active frequency in the receiver sequence matches the transmitter's identified frequency for transmitting its respective message, the respective transmitter transmits 608 its message.

As previously indicated, a problem may arise where multiple devices attempt to concurrently transmit information to a receiver(s) their respective transmitter frequency hopping sequences. Particularly, the "next" frequency to use in two or more transmitters could, at some point, both be set to the same frequency. This can result in a collision. FIG. 6 further illustrates an embodiment in which such collisions are managed in accordance with the present invention.

A collision can be detected in any known manner. For example, a receiving device(s) may recognize that two messages are being sent to it, and it can respond to one or both of the devices that a collision has occurred. In other embodiments the transmitting device may not receive an expected acknowledgement or other response, which prompts a retry of the message transmission at the transmitter. In such an example, a timer may be used to determine the length of time that the transmitter will wait for an acknowledgement or other response before determining that the message must be resent. In any event, if a collision occurs, a retry of one, more or all of the colliding messages from their respective transmitting devices will take place. Each transmitter is notified of the collision in any known manner, such as receiving a message indicating a collision, receiving a retry notification, failing to receive a message acknowledgement, etc.

Regardless of the manner of detecting a collision, it is determined 610 whether a collision has occurred. If not, the transmitting devices wait until another message is to be transmitted, as depicted at block 612. When a new message is to be transmitted, the transmitting device again identifies 604 its next communication frequency to use to transmit the message.

If a collision is detected 610, then the same message 614 is still at play. For example, a message queue, retry message queue or other mechanism preserves the message for another attempt to transmit the message. In this case, the transmitting device again identifies 604 its next communication frequency to use to re-transmit the same message. Thus, the subsequent attempt to transmit the message operates in the same manner as if a new message was being sent, in that the next frequency in the transmitter frequency hopping sequence is used as the transmission frequency. With each retry attempt, there is a progressively decreasing probability that message retries will collide with the message transmission from one or more other transmitters. Thus, not only does the present invention provide for inherent collision avoidance for original transmissions, it provides an inherent random backoff for retries by having each transmitter select the next frequency in its respective sequence for successive message retries.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 7:
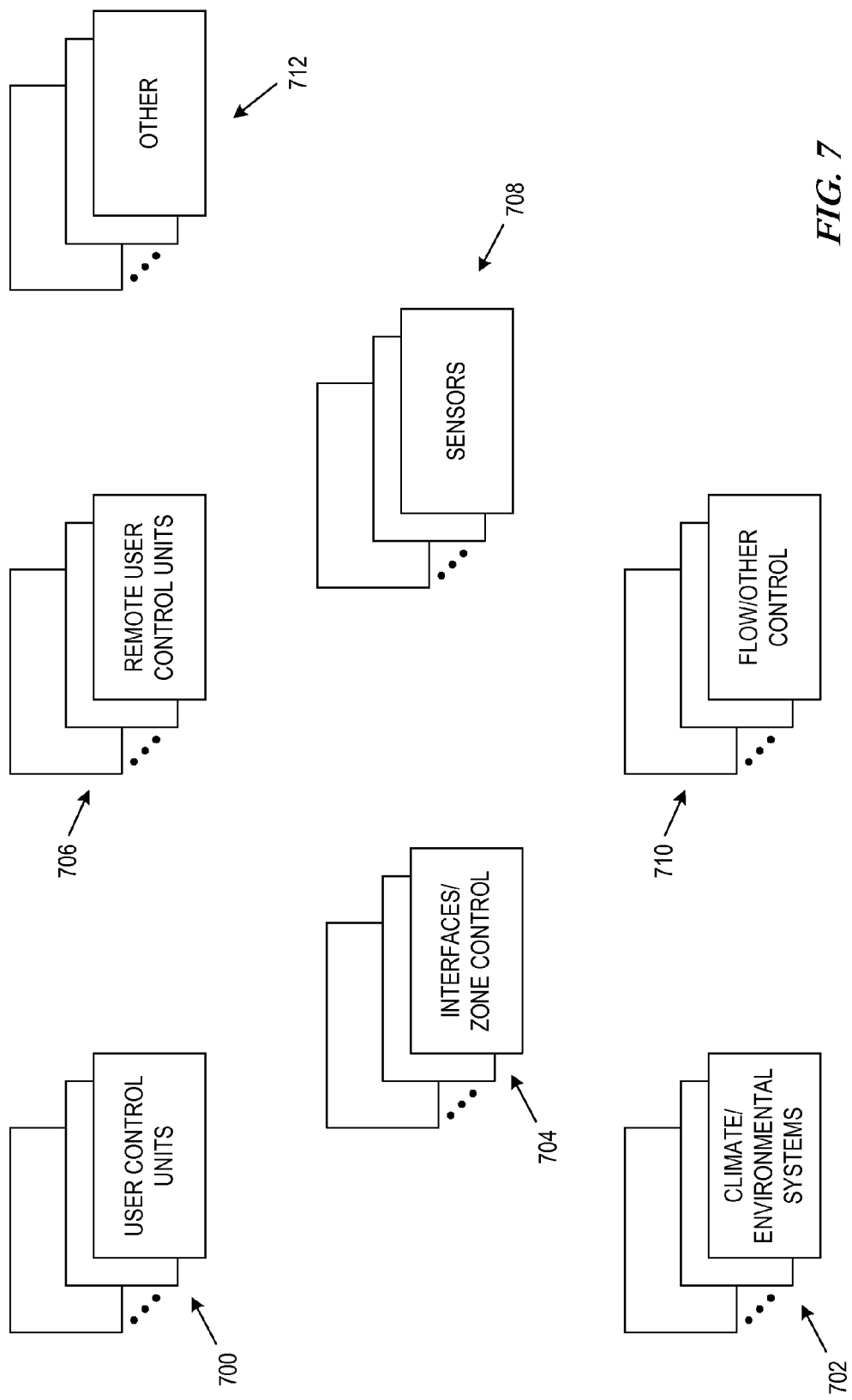
FIG. 7 is a block diagram generally illustrating representative HVAC elements and devices in which air interfaces may be used.

FIG. 7 is a block diagram generally illustrating representative HVAC elements and devices in which air interfaces may be used. FIG. 7 depicts one or more user control units 700, such as wireless thermostats where users can enter a temperature setpoint designating a desired temperature. Other examples of user control units 700 include humidity control units, lighting control units, security control units, etc. Climate or environmental systems 702 may include the equipment to cause the desired action to occur. One such system 702 is an HVAC system, which includes equipment to raise or lower temperature, humidity, etc. User control units 700 may communicate directly with such climate/environmental systems 702, and/or may communicate via one or more interfaces or zone controllers 704. Remote user control units 706 provide portable user control, such as providing a visual and/or audio interface to the user, and allowing the user to change environmental setpoints, check status, etc. Sensors 708 may be used to sense environmental conditions, and may be discrete devices (e.g. outdoor air/temperature sensor) or may be integrated into user control units 700. Flow and other control equipment 710 may also be used, such as dampers, ultraviolet air treatment lamps, etc. Any of these devices may need to communicate information amongst themselves and/or with other devices 712, in which the present invention may be utilized.

When these devices communicate wirelessly with one another via radio frequency (RF) or other wireless means, there is a reasonable chance that a wirelessly communicating device may experience interference from neighboring systems or other devices of the same system. Using frequency hopping can significantly reduce such interference. Communicating via frequency hopping sequences as described herein enables, among other things, multiple devices to communicate in an orderly fashion while addressing issues of potential collisions.

Some devices in the system may be powered by power sources and communicate via wire and/or over the air, while other devices may be battery-powered and communicate information wirelessly. Any device may be powered in any desired manner, including battery or other DC power, AC power, energy harvesting, etc. In one embodiment, devices that are powered by power sources, such as 24 volts AC (VAC), are referred to as "hosts," and may remain powered on while operating in the system. Other devices that are powered by battery may be referred to as "clients," and may enter a sleep mode to preserve battery life. A collection of devices including a host(s) and its clients may be referred to as a "group," and a collection of physical groups that communicate through their host(s) may be referred to as a "system." However, a "system" as otherwise used herein does not require any such groupings, and may involve as few as two communicating devices.

Figure 8A:
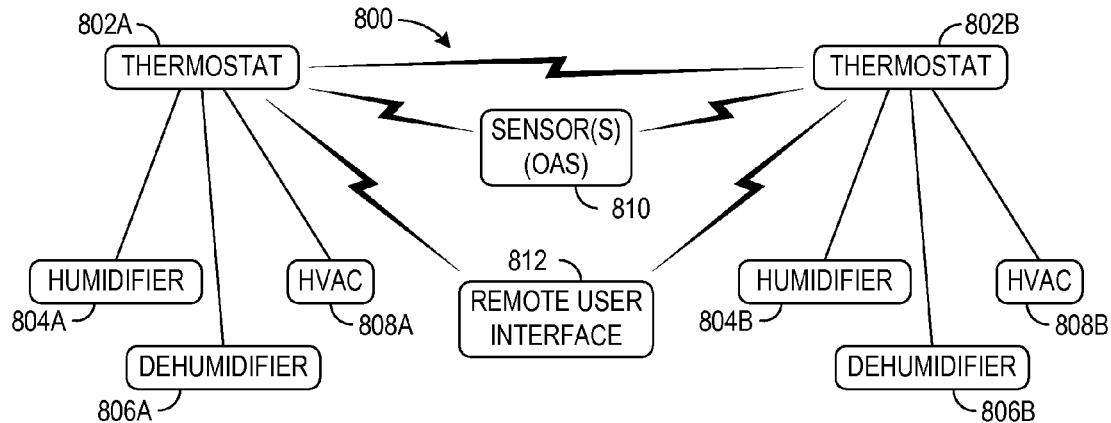
FIGS. 8A-8C depict some representative examples of clients, hosts, groups and systems that benefit from the invention.
Figure 8B:
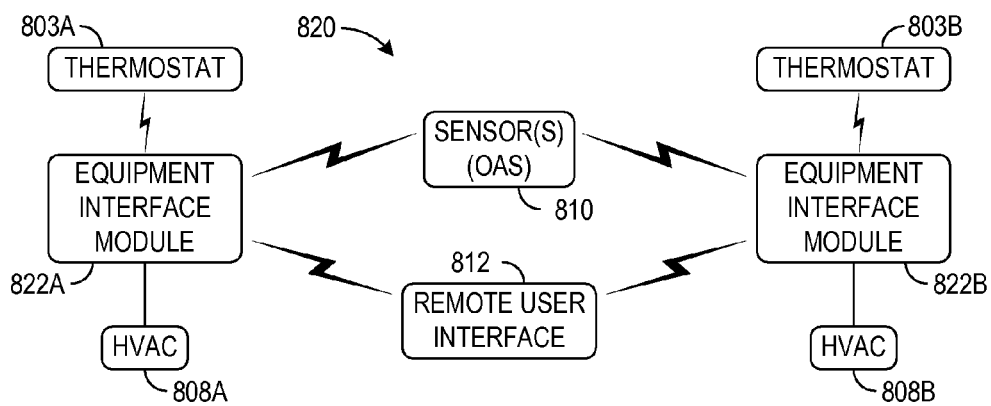
Figure 8C:
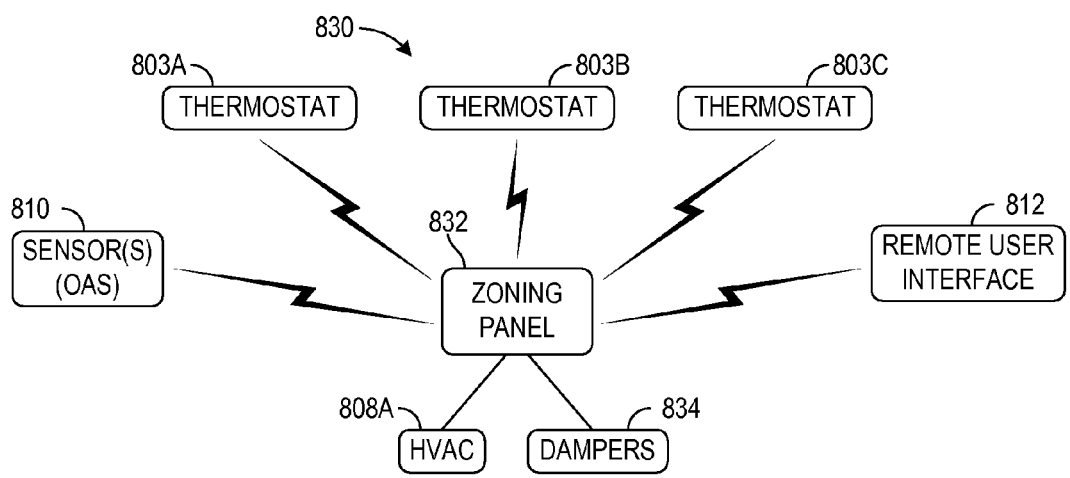

FIGS. 8A-8C depict some representative examples of clients, hosts, groups and systems that benefit from the communications via multiple frequency hopping sequences in accordance with the present invention. Like reference numbers are used for analogous devices where appropriate in FIGS. 8A-8C. Each of the devices depicted in FIGS. 8A-8C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 8A illustrates one system 800 where one or more thermostats 802A, 802B are configured as hosts, and may be powered by an AC power source, DC source or other power source. Each thermostat may be wired to other equipment such as humidifiers 804A, 804B, dehumidifiers 806A, 806B, and HVAC equipment 808A, 808B. Battery powered clients in the embodiment of FIG. 8A include one or more sensors 810, such as an outdoor air sensor (OAS), and one or more remote user interfaces (RUI) 812 which provide users with remote access and control of environmental conditions in the system 800. In accordance with one embodiment of the invention, clients such as the RUI 812 can serve as transmitters that transmit messages at frequencies dictated by a local or otherwise distinct frequency hopping sequence at times dictated by a shared frequency hopping sequence.

FIG. 8B illustrates another exemplary system 820 where one or more thermostats 803A, 803B are configured as clients, and may be powered by batteries. Each thermostat 803A, 803B respectively communicates wirelessly with an equipment interface module (EIM) 822A, 822B that may be AC-powered and wired to respective HVAC equipment 808A, 808B. In this embodiment, each EIM 822A, 822B operates as a host and communicates with various clients. For example, host EIM 822A can communicate wirelessly with clients including the thermostat 803A, the sensor(s) 810, and the RUI(s) 812. Similarly host EIM 822B can communicate wirelessly with clients including the thermostat 803B, the sensor(s) 810, and the RUI(s) 812. In accordance with embodiments of the invention, clients such as the thermostat 803A can transmit messages at frequencies dictated by a local or otherwise distinct frequency hopping sequence at times dictated by a shared frequency hopping sequence also used by a host(s) such as the EIM 822A to receive the messages.

FIG. 8C illustrates another system 830 which utilizes area zoning using a zoning panel 832. In this embodiment, the zoning panel 832 serves as a host that may be AC-powered. The zoning panel 832 of FIG. 8C is connected to other equipment such as the HVAC 808A and dampers 834. Clients include the thermostats 803A, 803B, 803C, a sensor(s) 810, RUI 812, and possibly dampers 834 when such dampers are wirelessly controlled. In accordance with the invention, clients such as any of the thermostats 803A/B/C can transmit messages at frequencies dictated by a local or otherwise distinct frequency hopping sequence at times dictated by a shared frequency hopping sequence also used by a host(s) such as the zoning panel 832 to receive the messages.

It should be noted that the exemplary environments described in FIGS. 7 and 8A-8C are provided merely for purposes of facilitating an understanding of representative systems in which the principles of the present invention may be employed. From the description provided herein, one skilled in the art can readily appreciate that the invention may be employed in any system of two or more communicating devices.

The functions associated with the present invention may be performed by discrete circuitry and/or computing system hardware. In one embodiment, the devices that will communicate with one another utilize a processor(s), CPU(s), computer(s), or other processing system to perform the stated functions. Accordingly, hardware, firmware, software or any combination thereof may be used to perform the various functions and operations described herein.

Figure 9:
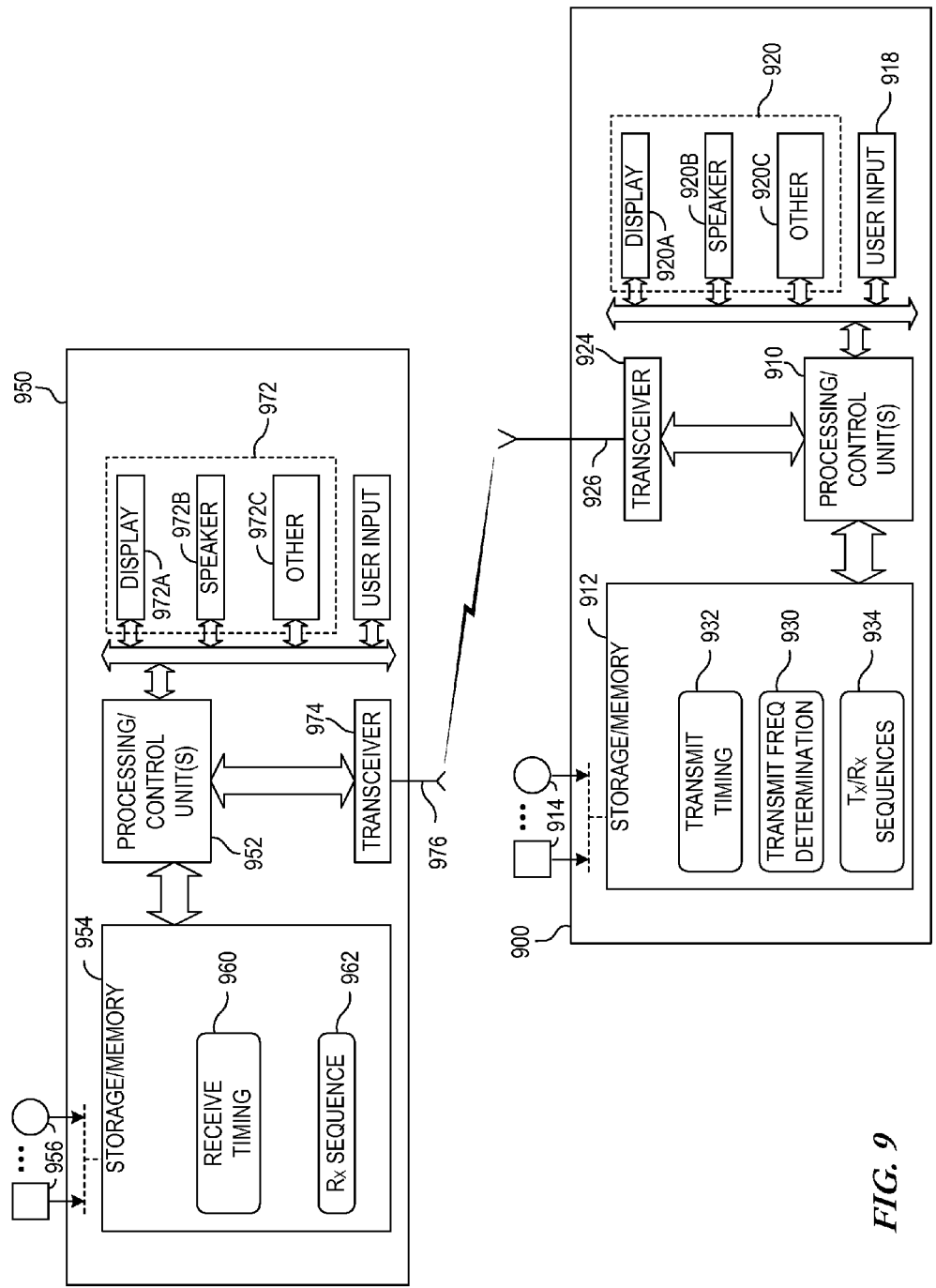
FIG. 9 illustrates representative processing arrangements for a communicating pair of devices.

Representative processing arrangements for a communicating pair of devices 900, 950 is illustrated in FIG. 9. The device 900 represents any transmitting device capable of performing the transmitting functions previously described. A device may be both a transmitting and receiving device, and a device referred to herein as a transmitting or receiving device is based on whether it is operating as a transmitter or receiver for purposes of that description. In the illustrated embodiment, the device 900 represents a transmitting client device that is capable of communicating over the air, such as by RF communications. By way of example and not of limitation, the device 900 may represent communication portions of a thermostat, sensor, remote control, damper, humidifier, dehumidifier, etc.

The representative device 900 implements computing/processing systems to control and manage the conventional device activity as well as the device functionality provided by the present invention. For example, the representative device 900 includes a processing/control unit 910, such as a microprocessor, controller, reduced instruction set computer (RISC), central processing module, etc. The processing unit 910 need not be a single device, and may include one or more processors. For example, the processing unit may include a master processor and one or more associated slave processors coupled to communicate with the master processor.

The processing unit 910 controls the basic functions of the device 900 as dictated by programs available in the program storage/memory 912. The storage/memory 912 may include an operating system and/or various program and data modules associated with the present invention. In one embodiment of the invention, the programs are stored in non-volatile storage/memory so that the programs are not lost upon power down of the device. The storage 912 may also represent one or more of other types of read-only memory (ROM) and programmable and/or erasable ROM, random access memory (RAM), subscriber interface module (SIM), wireless interface module (WIM), smart card, or other fixed or removable memory device/media. The storage 912 may also include removable media 914 (e.g. disk, CD-ROM, DVD, etc.) that can be read via the appropriate interfaces and/or by appropriate media drives. The relevant software for carrying out device operations may be provided to the device 900 via any such storage media, or may be transmitted to the device 900 via data signals such as by way of a network.

For performing other device functions, the processor 910 may be coupled to user input interface 918 associated with the device 900. The user input interface 918 may include, for example, a keypad, function buttons, joystick, scrolling mechanism (e.g., mouse, trackball), touch pad/screen, and/or other user entry mechanisms.

A user interface (UI) 920 may be provided, which allows the user of the device 900 to perceive information visually, audibly, through touch, etc. For example, a display 920A and/or speaker 920B may be associated with the device 900. Other user interface (UI) mechanisms 920C can also or alternatively be provided.

The processor 910 is also coupled to a transceiver 924, which in the illustrated embodiment includes at least a transmitter. The transceiver 924 is configured to communicate RF signals using frequency hopping as described herein. The transceiver 924 is coupled to an antenna 926.

In one embodiment, the storage/memory 912 stores the various client programs and data used in connection with the present invention. For example, a transmit frequency determination module 930 can be provided for a transmitting device to identify the frequency at which it will next transmit a message. A transmit timing module 932 determines when the next transmission frequency becomes active in the receiver's frequency hopping sequence. The transmit and/or receive frequency hopping sequences 934 can be stored in the storage 912. In other embodiments the seed for the sequences 934 is stored in the storage 912, and the appropriate frequency hopping sequence is calculated using the seed when the sequence is needed.

These and other modules may be separate modules operable with the processor 910, may be a single module performing each of these functions, or may include a plurality of such modules performing the various functions. While the modules are shown as multiple software/firmware modules, they may or may not reside in the same software/firmware program. It should also be recognized that one or more of these functions may be performed using discrete hardware. These modules are representative of the types of functional modules that may be associated with a device in accordance with the invention, and are not intended to represent an exhaustive list. Also, other described functions not specifically shown may be implemented by the processor 910.

FIG. 9 also depicts a representative receiving device 950. In one embodiment, the device 950 represents the communication portions of a host device, such as thermostats, equipment interfaces, zoning panels, etc. The illustrated device 950 includes circuitry analogous to that of device 900, and similarly includes a processor 952 and storage/memory 954. In accordance with one embodiment, the storage/memory 954 and/or media devices 956 store the various programs and data used in connection with the invention. For example, the storage 954 may include a receive timing module 960 that is configured to determine when a frequency in its receiver frequency hopping sequence is active; i.e. what frequency is being listened to, and when. The storage 954 can store at least a receiver frequency hopping sequence 962, although it may also store a transmitter frequency hopping sequence (not shown) if it is also a transmitting device.

The device 950 may also include other components or modules for performing other device functions, such as a user input interface 970. The user input interface 970 may include, for example, a keypad, function buttons, joystick, scrolling mechanism (e.g., mouse, trackball), touch pad/screen, and/or other user entry mechanisms. Other components may include a user interface (UI) 972, which allows the user of the device 950 to perceive information visually, audibly, through touch, etc. For example, a display 972A and/or speaker 972B may be associated with the device 950. Other user interface (UI) mechanisms 972C can also or alternatively be provided. The illustrated processor 952 is also coupled to a transceiver 974 configured to transmit and receive RF signals using frequency hopping as described herein. The transceiver 974 is coupled to an antenna 976.

In one embodiment, the device 950 also uses the $R_X$ sequence 962 as its transmit ($T_X$) sequence. The timing of these transmissions could be at some derivative relative to "n" cycles of the $R_X$ total time sequence. This routine combined with synchronization information may provide a method which information (data) can be shared from device 950 to one or more device types 900, inclusive of the synchronization message itself. Synchronization may be determined in any known manner where one or more frequency hopping sequences are synchronized in time between two or more devices. For example, synchronization messages may be communicated from one or more devices to one or more other devices to exchange time information so that each device can determine information including when each device will begin monitoring any one or more of the frequencies of the frequency hopping sequence(s), which allows each of the devices to know which frequency is active at what time. Further, other information may also be exchanged, such as a device's view of current time, the time a last synchronization occurred, etc. A client device receiving a synchronization message from a host device may, for example, receive a time value at the host device when the synchronization message is sent, which allows the client to compare this host time value to its own time value to determine any offset between the host's view of current time and the client's view of current time. The offset can be used to account for differences in the relative views of current time between the host(s) and client (s). The use of synchronization messages or other communicated data may be used to enable communicating devices to know which frequency or frequencies are active at a given time, and thus any manner of synchronizing the devices for timing purposes can be used.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
   providing a transmitter frequency hopping sequence of a plurality of communication frequencies in a first order;
   providing a receiver frequency hopping sequence including at least the plurality of communication frequencies in a second order different from the first order;
   identifying the next communication frequency in the first order of the transmitter frequency hopping sequence in which to transmit data;
   a transmitter being privy to the receiver frequency hopping sequence; and
   the transmitter waiting until the identified communication frequency of the transmitter frequency hopping sequence corresponds to a receiver-monitored frequency in the receiver frequency hopping sequence to transmit the data at the identified communication frequency.

2. The method of claim 1, wherein identifying the next communication frequency in the first order of the transmitter frequency hopping sequence comprises storing the communication frequency at which the last data was transmitted, and identifying the communication frequency in the transmitter frequency hopping sequence that follows the stored communication frequency at which the last data was transmitted.

3. The method of claim 1, further comprising monitoring the receiver frequency hopping sequence relative to time, wherein each frequency of the receiver frequency hopping sequence is successively monitored for a time interval in an order dictated by the receiver frequency hopping sequence, and wherein the receiver-monitored frequency corresponds to a currently monitored frequency in the receiver frequency hopping sequence.

4. The method of claim 1, further comprising determining when the identified communication frequency of the transmitter frequency hopping sequence corresponds to the receiver-monitored frequency in the receiver frequency hopping sequence.

5. The method of claim 4, wherein determining when the identified communication frequency of the transmitter frequency hopping sequence corresponds to the receiver-monitored frequency comprises:
   storing the receiver frequency hopping sequence which is used by at least one receiver; and tracking expiration of time intervals in which each of the frequencies of the receiver frequency hopping sequence is the receiver-monitored frequency until the identified communication frequency of the transmitter frequency hopping sequence becomes the receiver-monitored frequency.

6. The method of claim 1, wherein the receiver frequency hopping sequence corresponds to a frequency hopping sequence used by one or more receiving devices to which the transmitted data can be received.

7. The method of claim 1, further comprising monitoring by one or more receivers for transmitted data, one frequency at a time, on each successive frequency of the receiver frequency hopping sequence.

8. The method of claim 7, wherein each monitored frequency of the receiver frequency hopping sequence is active for a predetermined time interval.

9. The method of claim 7, further comprising time synchronizing the receiver frequency hopping sequence in a transmitter transmitting the data with the receiver frequency hopping sequence at the one or more receivers.

10. A method comprising:
providing a plurality of transmitter frequency hopping sequences from a common set of communication frequencies for each of a respective plurality of transmitting devices, wherein each of the plurality of transmitter frequency hopping sequences includes the common set of communication frequencies in an order different from the transmitter frequency hopping sequences of the other transmitting devices;
providing a receiver frequency hopping sequence from the common set of communication frequencies, wherein the communication frequencies of the receiver frequency hopping sequence are in an order different from the orders of any of the plurality of transmitter frequency hopping sequences;
identifying at each transmitting device the next communication frequency of its respective transmitter frequency hopping sequence in which to transmit a message;
each transmitting device, being privy to the receiver frequency hopping sequence, determining at each transmitting device when its respective next communication frequency corresponds to a receiver-monitored frequency in the receiver frequency hopping sequence; and
waiting until each of the identified communication frequencies of their respective transmitter frequency hopping sequences corresponds to the receiver-monitored frequency in the receiver frequency hopping sequence to transmit messages from the transmitting devices at their respective next communication frequencies.

11. The method of claim 10, wherein providing a plurality of transmitter frequency hopping sequence comprises providing a different one of the transmitter frequency hopping sequences for each of a corresponding number of the transmitting devices.

12. The method of claim 10, wherein identifying at each transmitting device the next communication frequency of its respective transmitter frequency hopping sequence in which to transmit a message comprises, for each of the transmitting devices:
storing the communication frequency at which its last message was transmitted; and
identifying the communication frequency in its transmitter frequency hopping sequence that follows the stored communication frequency at which the last message was transmitted.

13. The method of claim 10, further comprising each of the transmitting devices monitoring the receiver frequency hopping sequence relative to time, wherein each frequency of the receiver frequency hopping sequence is successively monitored for a time interval in an order dictated by the receiver frequency hopping sequence, and wherein the receiver-monitored frequency corresponds to a currently monitored frequency in the receiver frequency hopping sequence.

14. The method of claim 10, wherein the receiver frequency hopping sequence corresponds to a frequency hopping sequence used by one or more receiving devices to which the transmitted data can be received.

15. The method of claim 14, further comprising receiving the messages at the one or more receiving devices when the receiver frequency hopping sequence reaches the receiver-monitored frequency that corresponds to the respective communication frequencies used by the transmitting devices to transmit the messages.

16. The method of claim 10, further comprising:
identifying a collision of messages transmitted by at least two of the transmitting devices;
identifying, at one or more of the transmitting devices identifying the collision, the next communication frequency of its respective transmitter frequency hopping sequence in which to retransmit the respective message;
determining, at the one or more transmitting devices identifying the collision, when its respective next communication frequency corresponds to the receiver-monitored frequency in the receiver frequency hopping sequence; and
retransmitting the respective messages from the one or more transmitting devices identifying the collision when each of the identified communication frequencies of their respective transmitter frequency hopping sequences corresponds to the receiver-monitored frequency in the receiver frequency hopping sequence.

17. The method of claim 10, further comprising sharing the receiver frequency hopping sequence among one or more receiving devices.

18. The method of claim 17, further comprising time-synchronizing the receiver frequency hopping sequence in the transmitting and receiving devices.

19. An apparatus comprising:
a transmission frequency determination module configured to identify a transmission frequency in a first frequency hopping sequence;
a transmission timing module, being privy to a second frequency hopping sequence different from the first frequency hopping sequence, configured to determine when the identified transmission frequency occurs during successive intervals of the second frequency hopping sequence; and
a transmitter configured to wait to transmit a message at the identified transmission frequency of the first frequency hopping sequence until the identified transmission frequency occurs at one of the successive intervals of the second frequency hopping sequence.

20. A system comprising:
at least one receiving device comprising a receive timing module configured to successively monitor for messages at each frequency of a receiver frequency hopping sequence;
a plurality of transmitting devices, each comprising:
a frequency determination module configured to identify a transmission frequency in a transmitter frequency hopping sequence different from the receiver frequency hopping sequence;

a transmission timing module, being privy to the receiver frequency hopping sequence, configured to determine when the identified transmission frequency occurs during successive intervals of the receiver frequency hopping sequence; and a transmitter configured to wait to transmit a message at the identified transmission frequency of the transmitter frequency hopping sequence until the identified transmission frequency occurs at one of the successive intervals of the receiver frequency hopping sequence.

21. The system of claim 20, wherein each of the plurality of transmitting devices is associated with a different transmitter frequency hopping sequence, and wherein each of the different transmitter frequency hopping sequences differ from the receiver frequency hopping sequence.

22. The system of claim 20, wherein the transmission frequency determination module is configured to identify the transmission frequency by identifying the next consecutive frequency in the transmitter frequency hopping sequence relative to the frequency most recently used by the transmitting device to transmit a preceding message.

23. The system of claim 20, wherein each of the plurality of transmitting devices comprises a storage to store the transmitter frequency hopping sequence, and wherein the transmitter frequency hopping sequence for each of the transmitting devices is unique relative to other transmitter frequency hopping sequences in the system.

24. The system of claim 20, wherein each of the plurality of transmitting devices comprises a storage to store a seed that is unique relative to seeds of other transmitting devices in the system, and wherein the transmitting devices storing the seeds each further comprise a processor configured to generate a system-unique transmitter frequency hopping sequence based on their respective seeds.

25. The system of claim 20, wherein the at least one receiving device further comprises a processor configured to identify a frequency of the receiver frequency hopping sequence in which to transmit data to one or more of the plurality of transmitting devices, and further comprising a transmitter configured to transmit the data at the identified frequency.

26. The system of claim 25, wherein the data transmitted by the at least one receiving device to the one or more of the plurality of transmitting devices comprises time synchronization data usable by the one or more transmitting devices to time synchronize at least the receiver frequency hopping sequence.

\* \* \* \* \*